United States Patent
Schmidt et al.

(10) Patent No.: US 7,062,349 B2
(45) Date of Patent: Jun. 13, 2006

(54) CONTROL EQUIPMENT FOR AN INDUSTRIAL SEWING MACHINE

(75) Inventors: Thomas Schmidt, Rauenberg (DE); Michael Knop, Altflubheim (DE); Wolfgang Sinn, Rauenberg (DE); Rainer Böhm, Heidelberg (DE); Michael Faulhaber, Mannheim (DE)

(73) Assignee: Frankl & Kirchner GmbH & Co. K.G., Schwetzingen (DE)

(*) Notice: Subject to any disclaimer, the term of this patent is extended or adjusted under 35 U.S.C. 154(b) by 592 days.

(21) Appl. No.: 10/242,793

(22) Filed: Sep. 13, 2002

(65) Prior Publication Data

US 2005/0096754 A1    May 5, 2005

Related U.S. Application Data

(63) Continuation-in-part of application No. 09/340,735, filed on Jun. 29, 1999, now abandoned.

(51) Int. Cl.
*D05B 69/10* (2006.01)

(52) U.S. Cl. .................... 700/136; 700/12; 112/277

(58) Field of Classification Search ................ 700/183, 700/136, 12; 112/275, 277
See application file for complete search history.

(56) References Cited

U.S. PATENT DOCUMENTS

| 4,236,103 | A |   | 11/1980 | Matthey et al. |
|-----------|---|---|---------|----------------|
| 4,517,909 | A | * | 5/1985  | Neki et al. ................ 112/275 |
| 4,602,581 | A |   | 7/1986  | Neki et al. |
| 4,837,672 | A |   | 6/1989  | Donze |
| 5,008,601 | A |   | 4/1991  | Nakamura et al. |
| 5,233,278 | A |   | 8/1993  | Carter |
| 5,391,830 | A |   | 2/1995  | Nishino et al. |
| 5,402,015 | A | * | 3/1995  | Hammermann .............. 326/75 |
| 5,865,134 | A | * | 2/1999  | Okuyama et al. ........ 112/102.5 |
| 6,027,029 | A | * | 2/2000  | Kim ........................... 235/492 |

FOREIGN PATENT DOCUMENTS

| DE | 36 32 479 C3 | 4/1987 |
| DE | 36 27 837 A1 | 2/1988 |
| DE | 39 24 824 C2 | 2/1991 |

* cited by examiner

*Primary Examiner*—Leo Picard
*Assistant Examiner*—Steven R. Garland
(74) *Attorney, Agent, or Firm*—Browdy and Neimark, PLLC

(57) ABSTRACT

In a control equipment for an industrial sewing machine, it being possible, via switchgears such as switches, probes, sensors or the like, to switch on or off functions and connection states, by a certain voltage level being applied to an input circuit of the control, the input circuit generating an output signal, it is provided that upon the application of varying input voltages $U_e$, the output voltages $U_a$ generated are the same in each case.

10 Claims, 4 Drawing Sheets

CONTROL EQUIPMENT FOR AN INDUSTRIAL SEWING MACHINE

This is a continuation-in-part of U.S. application Ser. No. 09/340,735, filed Jun. 29, 1999, and now abandoned, the disclosure of which is incorporated herein by reference.

BACKGROUND OF THE INVENTION

1. Field of the Invention

The invention relates to a control equipment for an industrial sewing machine, it being possible, via switchgears such as switches, probes, sensors or the like, to switch on or off functions and connection states by a certain voltage level being applied to an input circuit of the control in order to generate a certain connection state.

2. Background Art

In the field of industrial sewing machines, voltage levels in the form of the electric potentials 0 V, +5 V, +24 V are defined as connection levels. Depending on the type of sewing machine, the sewing machine manufacturer, the use and wiring, switchgears are used, which work with the mentioned varying connection levels. In known control equipments, differing input circuits and circuit dimensionings are required by the varying connection levels. With input circuits of the type under regard, it is known to modify the connection levels for the activation of the input circuit by the program-controlled connection of certain circuit elements, so-called pull-up or pull-down resistors, the known circuits however having the drawback that the input circuit is only activated when a single defined connection level is applied. As a result, varying controls for almost identical requirements must be made available during the manufacture of controls for different types of sewing machines or fields of application, because the connection levels for the individual switchgears are differently defined.

U.S. Pat. No. 4,837,672 describes a control circuit being able to produce a supplying voltage starting from different input voltages, i.e. 100 V or 220 V.

U.S. Pat. No. 4,236,103 teaches a corresponding power supply for a sewing machine.

U.S. Pat. No. 6,027,029 describes a smart card as an example for a control card converting a program voltage. This conversion only takes places, as long as this program voltage is under a certain threshold level. If this is verified, input voltages are converted to first and second voltages of a given level. These levels act as a single level voltage pair having a switching level in-between.

U.S. Pat. No. 5,865,134 describes another example for a control card.

U.S. Pat. No. 4,602,581 and U.S. Pat. No. 5,008,601 disclose the usage of an A/D-converter for a speed control of a sewing machine.

SUMMARY OF THE INVENTION

It is the object of the invention to embody an equipment of the type mentioned at the outset such that the drawbacks known from the prior art are avoided and it is correspondingly possible to use one and the same control equipment for the most varying sewing machines and fields of application.

According to the invention, this object is attained in that upon the application of varying input voltage levels, for each input voltage connection states representing the same logical levels are generated, the generation of the connection states depending on switching levels being assigned to the respective input voltages $U_e$. Therefore, the connection states generated are the same in each case irrespective of the chosen input voltage level. Correspondingly, the control equipment according to the invention can be employed for the most varying sewing machines, since it is able to process the correspondingly varying input voltage levels.

Preferably, it is provided that the input circuit being associated with a respective input voltage to be applied, for instance 0 V, 24 V, comprises an input circuit element and that an activation equipment is allocated to the input circuit element such that, depending on the application of a certain input voltage, an associated input circuit element is activated such that an output voltage signal representing a logical level assigned to the connection states to be generated is the same regardless of the input voltage applied.

In keeping with an alternative embodiment, it is provided that the control unit recognizes the activation of an input via an analogue-to-digital converter.

Details of the invention will become apparent from the ensuing description of a preferred exemplary embodiment, taken in conjunction with the drawing.

DESCRIPTION OF THE PREFERRED EMBODIMENT

Figure 1:
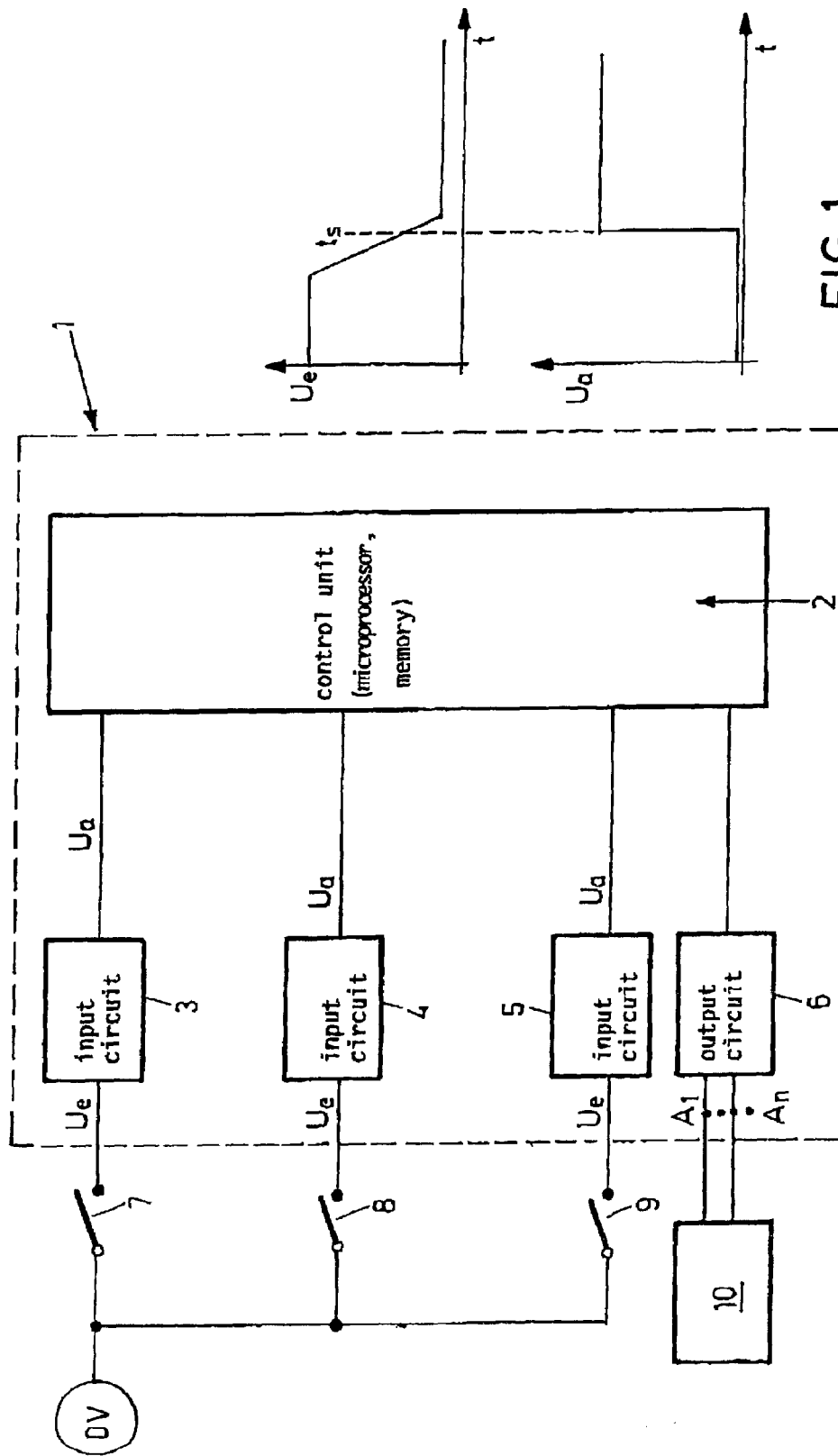
FIGS. 1 and 2 are block-diagram-type illustrations of a control equipment and of the voltage levels in the on and off condition according to the prior art.
Figure 2:
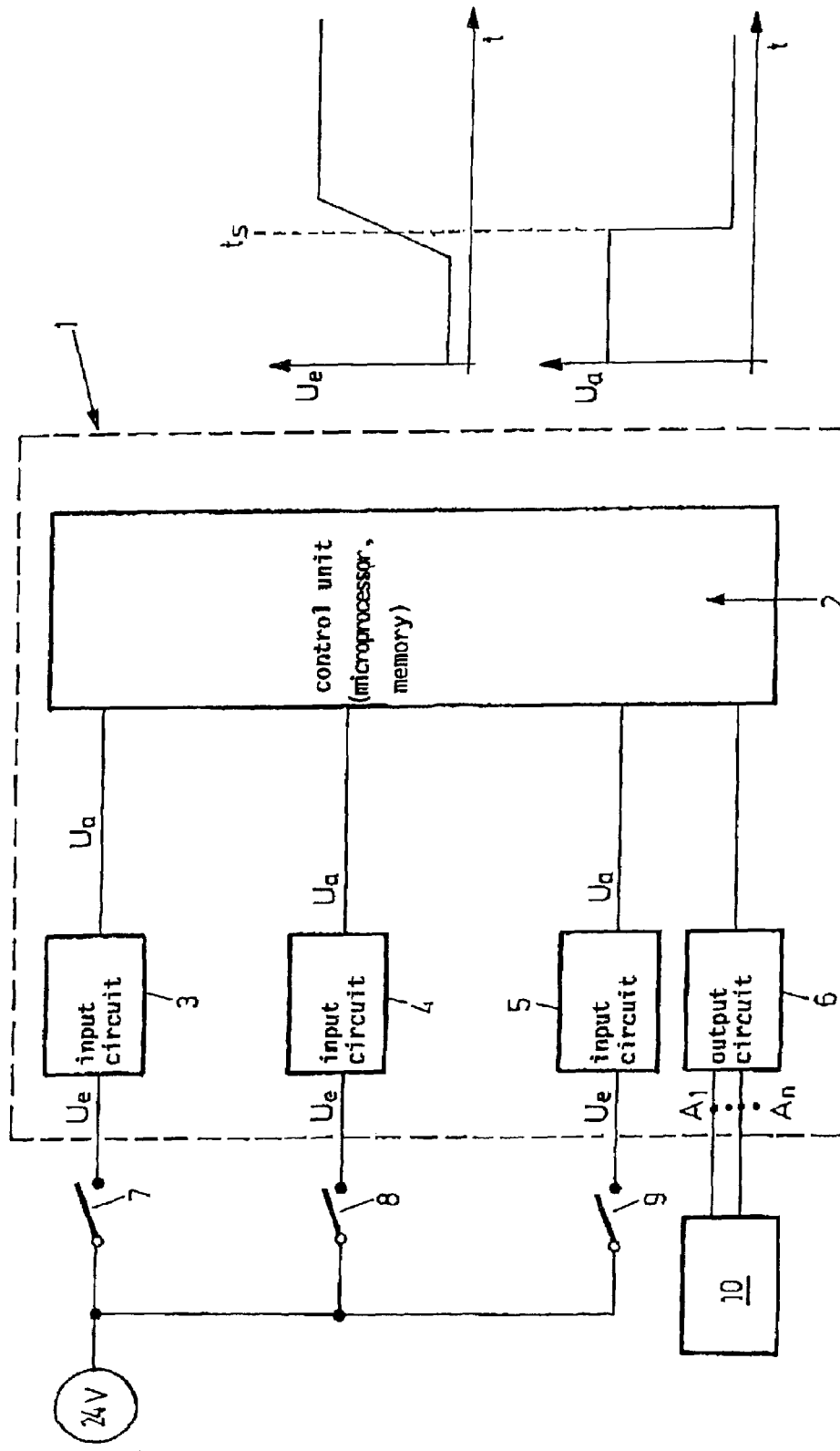

A control equipment 1 seen in FIGS. 1 and 2 comprises a control unit or a microprocessor 2 with a memory as well as input circuits 3 to 5 and an output circuit 6 for the connection of peripheral equipments 10 (magnets, valves, motors etc.).

An input voltage $U_e$ is applied to the input circuits 3 to 5 and an output voltage $U_a$ is generated in these circuits on the output side.

A connection voltage of 0 V is applied to these input circuits 3 to 5 via switchgears 7, 8, 9.

On the right in FIG. 1, the input voltage $U_e$ is illustrated in dependence on the time and so is the output voltage $U_a$ before and after a modification of the connection state at the moment $t_s$.

The input circuits 3 to 5 comprise a transistor stage with input filters and a pull-up resistor against 24 V or 5 V, which is not illustrated in detail. In this input circuit, the input voltage or the input signal $U_e$, respectively, is inverted as a logic signal $U_a=5$ V and transmitted to the control unit 2.

The illustration in FIG. 2 is fundamentally identical with that according to FIG. 1, the latter only illustrating the conditions which prevail when a voltage of 24 V is used as an operating voltage.

Correspondingly, the input circuits 3 to 5 again comprise a transistor stage with input filters and a pull-down resistor against 0 V. There, the input signal $U_e$ is inverted as a logic signal $U_a=0$ V and transmitted to the control unit 2.

FIGS. 1 and 2 show that the connection levels $U_a$ at the output differ in dependence on the input voltage $U_e$ used so that in each case only a certain defined sewing machine on which these input voltages are patterned can be operated by such a control equipment. Only one circuit input voltage designated $U_e$ in FIGS. 1 and 2 can be processed using the control equipment of this prior art.

Figure 3:
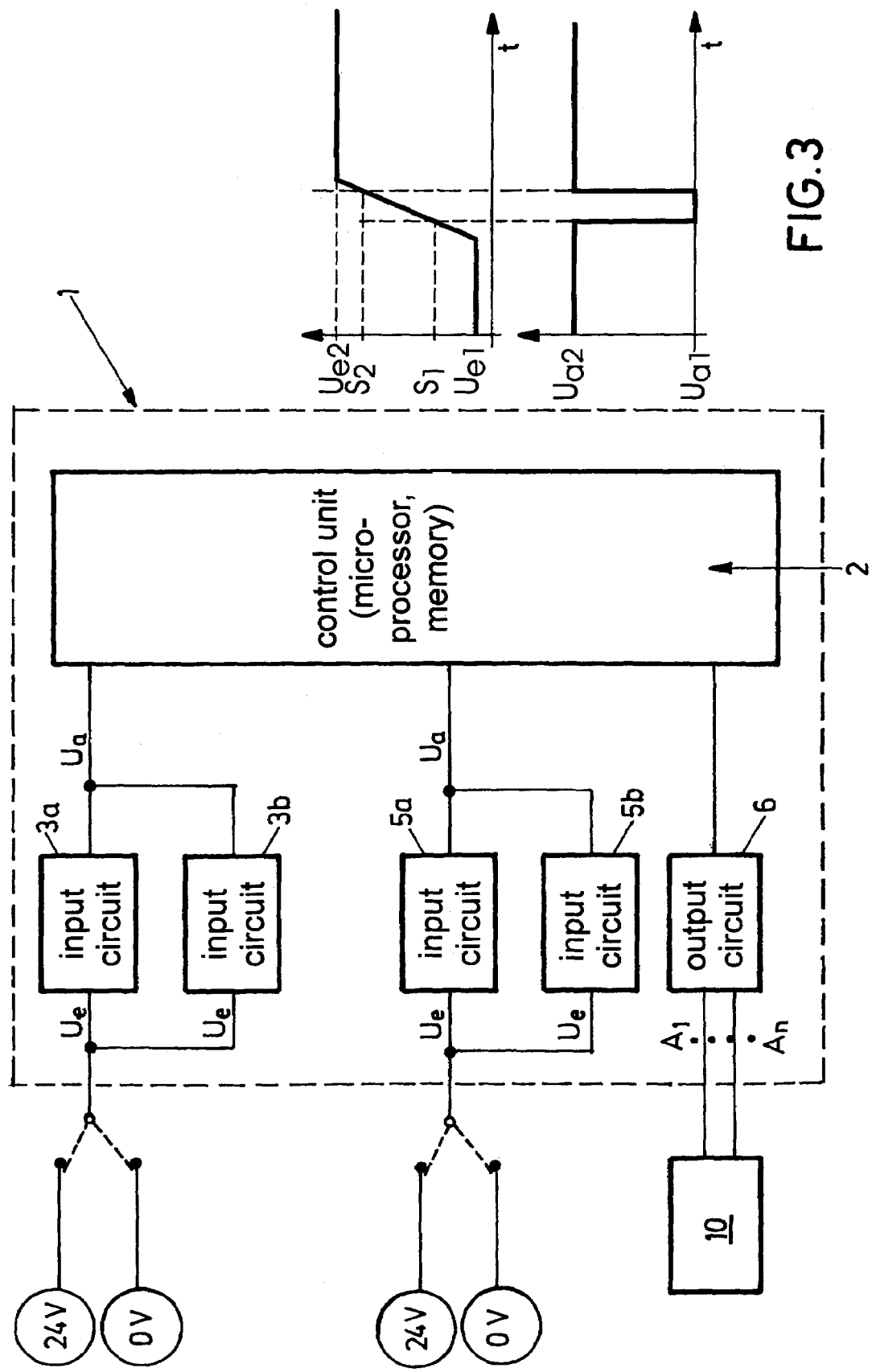
FIGS. 3 and 4 are corresponding illustrations of a control equipment according to the invention.
Figure 4:
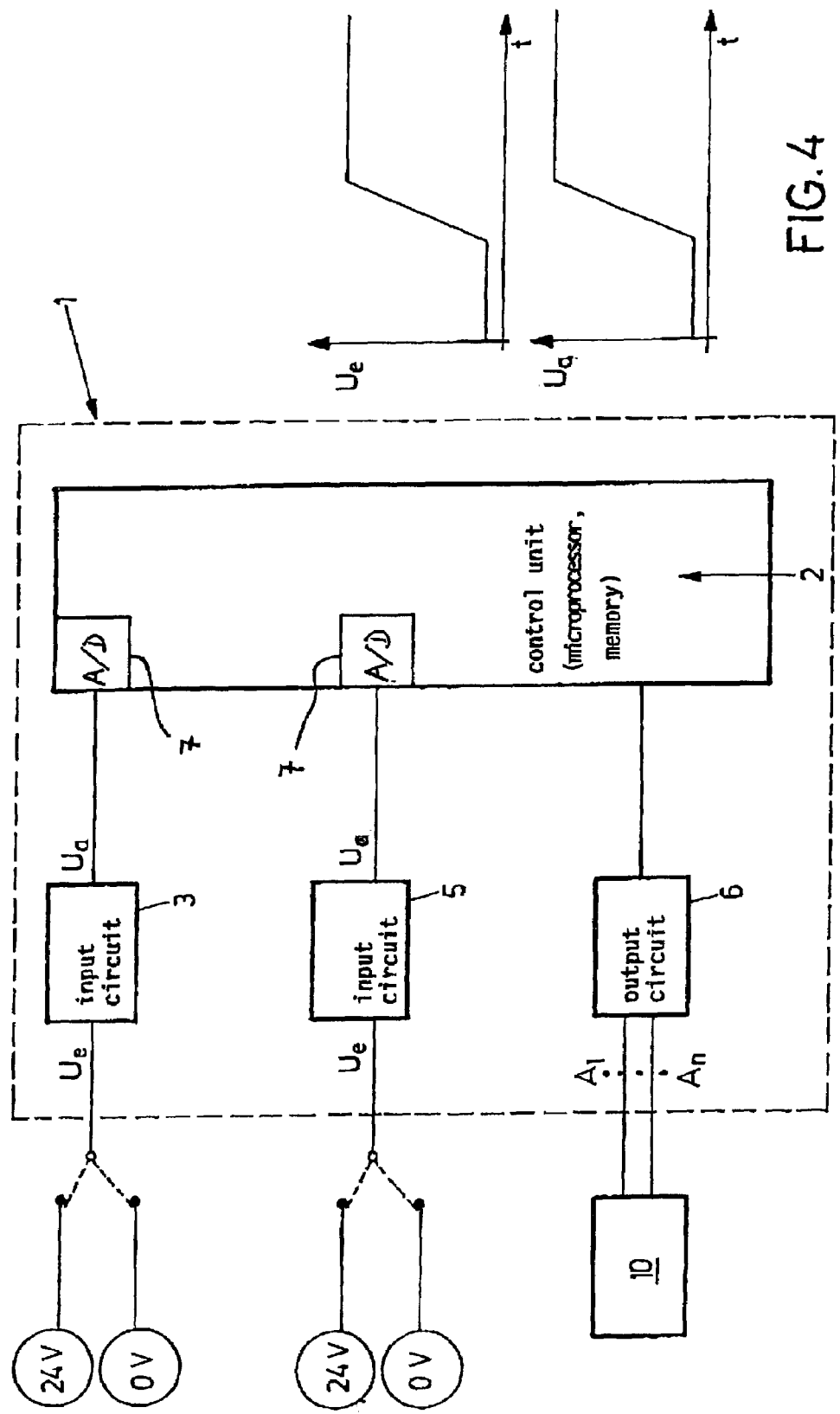

As opposed to this, FIGS. 3 and 4 show that in each case identical output voltages $U_a$, i.e. output voltage levels $U_{a1}$, $U_{a2}$, e.g. representing the same logical levels, are attained irrespective of an input voltage $U_e$ chosen from a group of input voltages $U_{e1}$, $U_{e2}$ due to the circuit arrangement according to the invention which will be described in detail in the following.

An input circuit 3 and 5 according to the invention and seen in FIG. 3 comprises at least two individual circuit elements 3a, 3b and 5a, 5b, which each comprise transistor stages with input filters. In this exemplary embodiment the input levels $U_{e1}$, $U_{e2}$ can be 0 V or 24 V. Depending on which input level $U_{e1}$, $U_{e2}$ is applied, one of the two input circuit members 3a or 3b and 5a or 5b, respectively, is activated so that it is ensured that an output voltage $U_{a1}$ of 0 V (logical low) or $U_{a2}$ of 5 V (logical high), as seen on the right in FIG. 3, is generated regardless of whether the connection level $U_{e1}$ of 0 V or $U_{e2}$ of 24 V is applied to the input circuits.

Switching of the output voltage $U_a$ between the logical high state $U_{a2}$ and the logical low state $U_{a1}$ is executed by voltages switching levels $S_1$, $S_2$ corresponding to each input voltage $U_{e1}$, $U_{e2}$. The input voltage $U_{e1}$ corresponds to a first switching level $S_1$. In the given example, where $U_{e1}$ is 0 V and $U_{e2}$ is 24 V, the first switching level $S_1$ lies between 0 V and 12 V. The second input voltage $U_{e2}$ corresponds to a second switching level $S_2$. In the given example this second switching level $S_2$ lies in the range between 12 V and 24 V. Both input voltages $U_{e1}$, $U_{e2}$ may serve as first logical input levels which, together with an input level counterpart being separated from this first logical level by the corresponding switching level $S_1$, $S_2$, may be used to trigger the same logical output voltages $U_{a1}$, $U_{a2}$.

It is possible to connect sensors of the NPN or the PNP switching type, respectively, to the input circuit.

In the embodiment seen in FIG. 4, the input voltages $U_e$ which may for instance again be 0 V or 24 V are transmitted via input circuits 3 or 5, which generate an output signal $U_a$, directly to analogue-to-digital converters 7 of the control unit 2, the analogue connection level being evaluated within the control unit 2 and the connection state being correspondingly recognized. To this purpose, the digital value obtained from the respective analogue-to-digital converter 7 corresponding to the received output signal $U_a$ is internally compared with modifiably stored switching levels $S_1$, $S_2$ in the control unit 2. This comparison may be done by software means. The resulting connection state recognized by the control unit 2 corresponds to that discussed above with respect to the logical output voltages $U_{a1}$, $U_{a2}$ described above with reference to FIG. 3. In this embodiment, too, the corresponding evaluation, as seen on the right in FIG. 4, helps attain that the correct connection state is generated regardless of whether the input level amounts to 0 V or 24 V. With respect to the features not mentioned the embodiment of FIG. 4 corresponds to that of FIG. 3.

What is claimed is:

1. A control equipment for an industrial sewing machine, controlling switchgears to switch on or off functions and connections states by a certain input voltage level being applied to an input circuit of said control equipment, the input circuit generating an output signal for a control unit, wherein connection state generation means are present which upon the application of input voltages $U_e$ varying due to the type of sewing machine generate for each input voltage $U_e$ connection states, and wherein switching level assignment means are present which assign switching levels to the respective applied input voltage $U_e$ such that the connection states are generated depending on the switching levels.

2. A control equipment according to claim 1, wherein the switchgears are selected from a group comprising switches, probes or sensors.

3. A control equipment according to claim 1, wherein the input circuit being associated with a respective input voltage to be applied comprises an input circuit element and wherein an activation equipment is allocated to the input circuit elements such that, depending on the application of a certain input voltage $U_e$, an associated input circuit element is activated such that an output voltage signal $U_a$ representing a logical level assigned to the connection states to be generated is the same regardless of the input voltage $U_e$ applied.

4. A control equipment according to claim 3, wherein the input voltages to be applied are 0 V, 24 V.

5. A control equipment according to claim 1, wherein the control unit measures the applied voltage $U_e$ via an analogue-to-digital converter and, on a basis of modifiably stored switching levels, decides which connection state prevails.

6. Control equipment for controlling a selected industrial sewing machine of one of a plurality of types, for controlling switchgears to switch on or off functions and connection states by a certain input voltage level that is dependent on the type of the selected sewing machine, said control equipment comprising:
an input circuit connected for receiving the voltage level as an input voltage and for generating an output signal for a control unit;
connection state generation means operative for generating connection states for each input voltage dependent on the selected sewing machine type; and
switching level assignment means connected for assigning switching levels to the respective applied input voltage such that the connection states are generated depending on the switching levels.

7. The control equipment according to claim 6, wherein the switchgears are selected from a group comprising switches, probes or sensors.

8. The control equipment according to claim 6, wherein said input circuit comprises input circuit elements, and said control equipment further comprises activation equipment allocated to said input circuit elements such that, depending on the application of a certain input voltage, an associated input circuit element is activated such that an output voltage signal representing a logical level assigned to the connection states to be generated is the same regardless of the value of the input voltage applied.

9. The control equipment according to claim 8, wherein the input voltages to be applied are 0 V and 24 V.

10. The control equipment according to claim 6, wherein the control unit measures the applied input voltage via an analogue-to-digital converter and, on a basis of modifiably stored switching levels, decides which connection state prevails.

* * * * *